Aug. 1, 1967 K. W. LINDBERG 3,334,294

FREQUENCY MULTIPLIER UTILIZING COMPOSITE MULTIPLE RESONANT CIRCUITS

Filed Feb. 13, 1964 2 Sheets-Sheet 1

INVENTOR.
KENNETH W. LINDBERG,
BY
Noel B. Hammond
AGENT.

Aug. 1, 1967 K. W. LINDBERG 3,334,294

FREQUENCY MULTIPLIER UTILIZING COMPOSITE MULTIPLE RESONANT CIRCUITS

Filed Feb. 13, 1964

2 Sheets-Sheet 2

INVENTOR.
KENNETH W. LINDBERG,
BY
Noel B. Hammond
AGENT.

United States Patent Office 3,334,294
Patented Aug. 1, 1967

3,334,294

FREQUENCY MULTIPLIER UTILIZING COMPOSITE MULTIPLE RESONANT CIRCUITS

Kenneth W. Lindberg, Redondo Beach, Calif., assignor to Hughes Aircraft Company, Culver City, Calif., a corporation of Delaware Filed Feb. 13, 1964, Ser. No. 344,684
9 Claims. (Cl. 321—69)

The present invention relates to frequency multiplying circuits and, more particularly, to a frequency multiplier employing resonant transmission lines and electrically variable unilaterally conductive impedance elements to provide frequency multiplication at ultra-high or microwave frequencies.

At ultra-high and microwave frequencies where conventional lumped constant tuned circuit elements are impractical, frequency multipliers may employ resonant transmission lines in conjunction with electrically variable unilaterally conductive impedance elements such as voltage-variable capacitors. However, prior art frequency multipliers of this type often do not provide sufficient isolation between the input and output circuits. As a result, the conversion loss is high and the efficiency is low due to dissipation of a portion of the output energy in the input circuit. The conversion loss is often on the order of 8 to 10 decibels and the output power is often as low as 100 milliwatts, for example.

Accordingly, it is an object of the present invention to provide a frequency multiplier employing resonant lines and electrically variable unilaterally conductive impedance elements in which the output energy is isolated from the input circuit.

Another object of the invention is the provision of a frequency multiplier employing resonant lines and electrically variable unilaterally conductive elements in which the converison loss is lower and the output power higher than heretofore attainable.

In accordance with these and other objects of the invention, there is provided a conductive case forming the outer conductor of a transmission line. Within the case is an elongated conductive member forming the inner conductor of a low impedance transmission line. This low impedance transmission line serves as an input tuned circuit and has a total length such as to be resonant at the fundamental or input signal frequency. A portion of the member is split to form the inner conductors of a first balanced pair of high impedance transmission lines tuned to the harmonic or output signal frequency. A second balanced pair of high impedance transmission lines tuned to the harmonic frequency is coupled by a pair of oppositely-poled, back-biased voltage-variable capacitors to the first pair of balanced lines. An input signal at the fundamental frequency applied to the low impedance transmission line is developed across the voltage-variable capacitors in-phase. Due to the non-linear series coupling capacitance of the voltage-variable capaictors, a harmonic signal is developed in the balanced transmission lines. The two components of the harmonic signal developed across the two voltage-variable capacitors have a 180° phase relationship. This results in the appearance of a virtual ground potential for the harmonic frequency at the junction at which the input transmission line is split to form the first pair of balanced lines. This virtual ground potential effectively isolates the harmonic signal from the input circuit. In this manner, a conversion loss on the order of 2 decibels and an output power in excess of one watt has been obtained when operating with an input frequency of 250 megacycles per second and an output frequency of 750 megacycles per second.

The following specification and the accompanying drawings describe and illustrate exemplifications of the present invention. Consideration of the specification and the drawings will provide a complete understanding of the invention, including the novel features and objects thereof. Like reference characters are used to designate like parts throughout the figures of the drawings.

Figure 1:
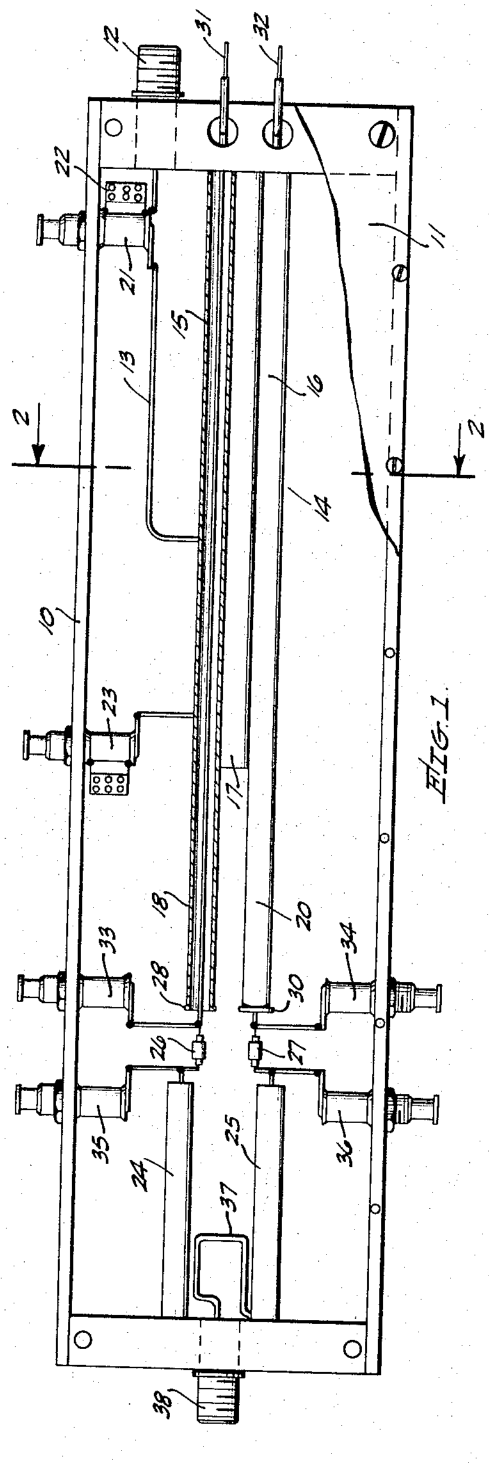
FIG. 1 is a plan view of an exemplary embodiment of a frequency multiplier in accordance with the invention with the top cover broken away to expose the interior construction thereof.
Figures 2, 3:
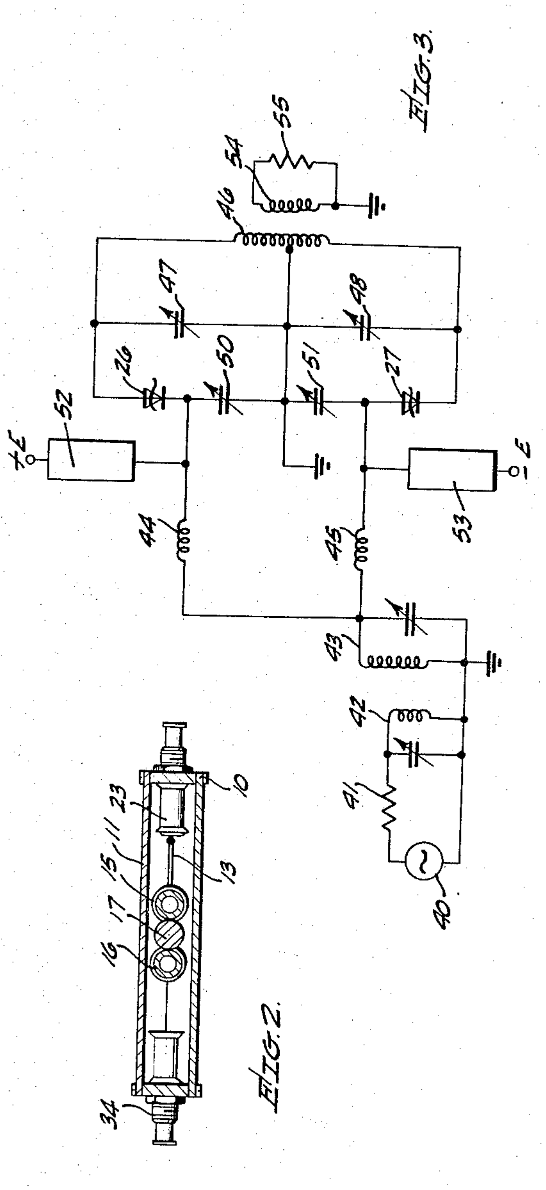
FIG. 2 is a side view in cross section of the frequency multiplier of FIG. 1 taken along the lines 2—2.
FIG. 3 is a schematic diagram of the equivalent electrical circuit of the frequency multiplier of FIGS. 1 and 2.

Referring now to FIGS. 1 and 2, in which is illustrated a frequency multiplier in accordance with the present invention, there is provided a conductive case or enclosure 10 which forms the outer conductor of transmission line sections and serves to confine electromagnetic energy coupled into the enclosure 10. The enclosure 10 is provided with a removable conductive cover 11 which is shown broken away. An input connector 12 for coaxial transmission line is disposed in one end of the enclosure 10, and is connected to one end of a conductor 13 which is formed into an input coupling loop. The other end of the conductor 13 is connected at a point where satisfactory coupling is obtained to an elongated conductive member 14 forming the center conductor of a low impedance transmission line.

The elongated conductive member 14 comprises, in the present example, two outer rods 15, 16 of the same length and a shorter inner rod 17. The three rods 15, 16, 17 are rigidly and conductively fastened to the end wall of the enclosure 10 adjacent the input connector 12. The rods 15, 16, 17 are aligned side by side in a common plane and are spaced away and insulated from the other walls of the enclosure 10. The over-all length of the two outer rods 15, 16 is selected or adjusted to resonate the low impedance transmission line at the fundamental or input signal frequency which, in the present example, may be on the order of 250 megacycles per second. The width and thickness of the conductive member 14 are selected or adjusted to match the impedance of the transmission line to the external circuit to be coupled to the input connector 12. In the present example, the impedance is on the order of 50 ohms.

The inner rod 17 is shorter than the outer two rods 15, 16 such that end portions 18, 20 of the outer rods 15, 16 extend beyond the inner rod 17 to form an elongated bifurcated section. These end portions 18, 20 form the center conductors of a pair of balanced high impedance transmission lines whose length is selected or adjusted such that they are tuned to a harmonic of the input frequency. In the present example, the output or harmonic frequency is the third harmonic of the input frequency, namely, on the order of 750 megacycles per second. The characteristic impedance of the pair of balanced transmission lines formed by the end portions 18, 20 is on the order of 100 ohms. The end portions 18, 20 of the two outer rods 15, 16 thus simultaneously form a part of the input circuit tuned to the fundamental frequency and a part of the output circuit tuned to the harmonic frequency.

Although the conductive member 14 is composed of three rods 15, 16, 17 of circular cross section in the present example, other configurations for the conductive member 14 may be employed. For example, the conductive member 14 may be, if desired, a flat rectangular bar having the distal and bifurcated.

The input coupling loop formed by the conductor 13 is connected to the conductive member 14 at the point at which an impedance match is obtained between the external source of signal and the low impedance transmission line. A coaxial trimmer capacitor 21 is mounted in the side wall of the enclosure 10 and connected to the conductor 13 to tune the input coupling loop so that a more perfect impedance match may be obtained. An additional mica capacitor 22 may be connected in parallel with the trimmer capacitor 21 if necessary. Another trimmer capacitor 23 is connected to the conductive member 14 to permit fine adjustments in tuning the input transmission line to be resonant in quarter wavelength mode at the input or fundamental frequency.

A pair of conductive rods 24, 25 extend from the other end of the enclosure 10 toward the bifurcated end portions 18, 20 of the conductive member 14. These rods 24, 25 are spaced apart from each other and form the center conductors of a second pair of balanced high impedance transmission lines. The length of the rods 24, 25 is adjusted for resonance in quarter-wave mode at the harmonic or output frequency (750 megacycles per second in the present example). The characteristic impedance of the pair of balanced transmission lines formed by these rods 24, 25 is on the order of 100 ohms.

Rods 15 and 16 have hollow centers and are provided with annular feed-through capacitors 28, 30 soldered into the distal ends thereof. A pair of voltage-variable capacitors 26, 27 of the semiconductor diode type, are connected from the feed-through capacitors 28, 30 to the rods 24, 25 extending from the other end of the enclosure 10. The voltage-variable capacitors 26, 27 are capacitively coupled by the feed-through capacitors 28, 30 to the ends of the rods 15 and 16 with respect to radio frequencies, but are insulated from rods 15 and 16 with respect to direct current. The first voltage-variable capacitor 26 is connected from end portion 18 to rod 24, and the second voltage-variable capacitor 27 is connected from end portion 20 to rod 25. The voltage-variable capacitors 26, 27 are connected with opposite polarity, that is, voltage-variable capacitor 26 has the cathode connected to end portion 18, while voltage-variable capacitor 27 has the anode connected to end portion 20.

The voltage-variable capacitors 26, 27 are reverse-biased by bias voltages applied via insulated wires 31, 32 extending through the hollow rods 15, 16 to the feed-through capacitors 28, 30. Trimmer capacitors 33, 34 are connected to the feed-through capacitors 28, 30 at the ends of the hollow rods 15, 16 for tuning the end portions 18, 20 to resonance. Another pair of trimmer capacitors 35, 36 are connected to the ends of rods 24 and 25 for tuning them to resonance. An output coupling loop 37 is symmetrically disposed between the two rods 24 and 25 and has one end connected to the enclosure 10 and the other end connected to an output connector 38 disposed in the end of the enclosure 10.

In operation, a signal at the fundamental frequency applied to the input connector 12 is coupled to the elongated conductive member 14 by the coupling loop formed by conductor 13. Due to the nonlinear series coupling capacitance of the voltage-variable capacitors 26, 27 a harmonic signal is developed in the balanced transmission lines formed by the bifurcated portion of the member 14 and by the rods 24 and 25. When the trimmer capacitors 23, 33, 34, 35, 36 are properly adjusted to resonate the transmission lines, a voltage maximum is developed across the voltage-variable capacitors 26, 27 at the fundamental frequency. The fundamental signal which appears across the voltage-variable capacitors 26, 27 is in-phase. The odd harmonic signal generated across the voltage-variable capacitors 26, 27 is, however, 180° out-of-phase. This results in the appearance of a virtual radio frequency ground potential for harmonic signals at the end of the short inner rod 17. This virtual ground potential effectively isolates the harmonic signal from the input circuit, preventing the harmonic signal from appearing in the input circuit. Accordingly, substantially all of the harmonic signal is coupled out the output connector 38 by the coupling loop 37.

The equivalent circuit of the frequency multiplier of FIGS. 1 and 2 is shown schematically in FIG. 3. The input signal is supplied by a signal source 40 having an internal impedance 41. The input coupling loop formed by the conductor 13, capacitors 21 and 22 and the shunt capacitance of the input coupling loop form a parallel resonant circuit, indicated at 42 in the equivalent circuit of FIG. 3. The elongated conductive member 14, the associated capacitor 23 and the distributed reactance associated therewith form the parallel resonant circuit indicated at 43 in the equivalent circuit. The end portion 18 of conductive rod 15 is indicated as inductor 44 in FIG. 3, and the end portion 20 of rod 16 is indicated as inductor 45. The output balanced transmission line formed by the rods 24 and 25 is indicated by the center-tapped inductor 46 in the equivalent circuit, and the tuning capacitors 35 and 36 and the associated shunt capacitance and are indicated at 47 and 48 in FIG. 3. The voltage-variable capacitors 26 and 27 are shown in FIG. 3 coupling the input resonant circuit 43 to the balanced transmission line shown as center-tapped inductor 46. The capacitors 33 and 34 of FIG. 1 together with the associated distributed capacitance of the circuit forms the tuning capacitors 50 and 51 of FIG. 3.

A positive bias potential with respect to ground, indicated as +E in FIG. 3 is conneced to the first voltage-variable capacitor 26 through a radio-frequency filter 52. Similarly, a negative bias potential with respect to ground, indicated as −E, is connected to the second voltage-variable capacitor 27 through a radio-frequency filter 53. The output coupling loop 37 of FIG. 1 is indicated as inductance 54 in FIG. 3, and the external load to which the circuit is connected is indicated by impedance element 55 in FIG. 3.

Figure 5:
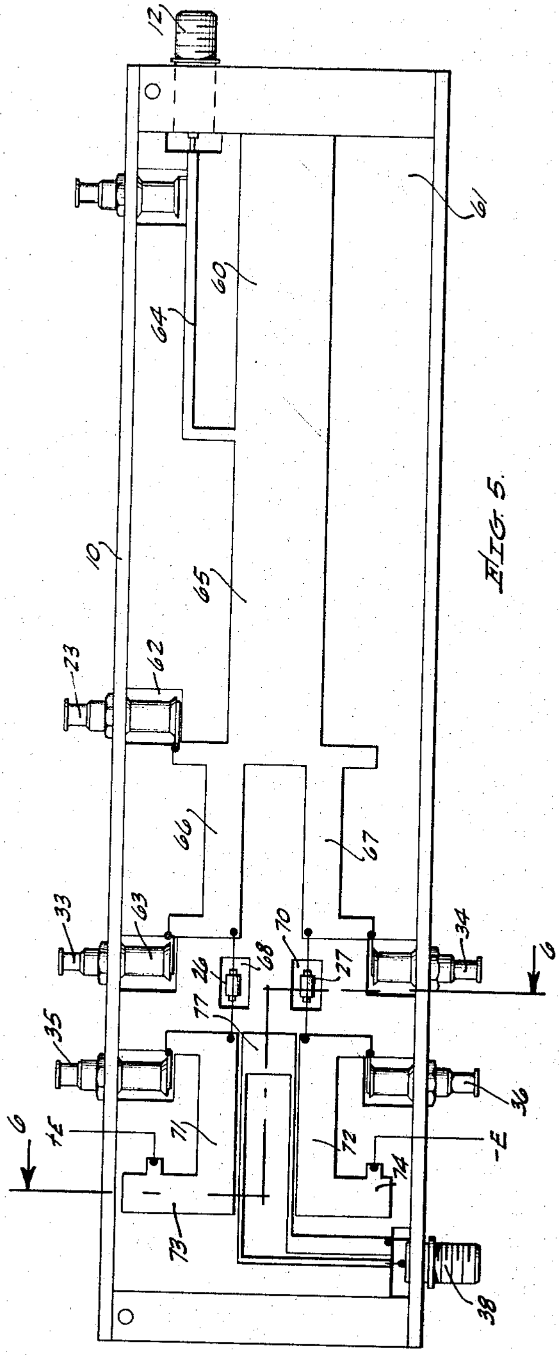
FIG. 5 is a side view in cross section of the frequency multiplier of FIG. 4 taken along the lines 5—5.
Figure 4:
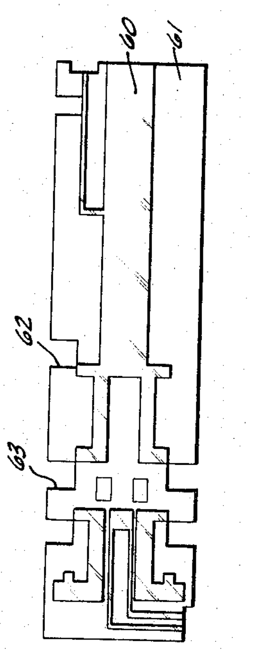
FIG. 4 is a plan view of another embodiment of a frequency multiplier in accordance with the invention.
Figure 6:
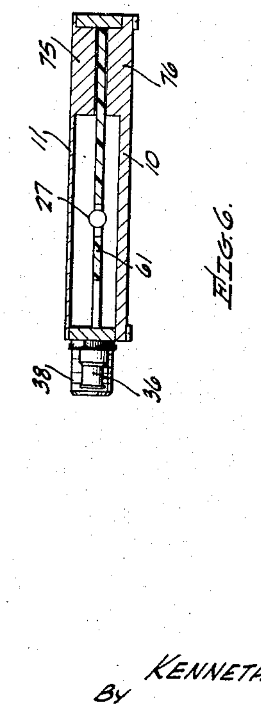
FIG. 6 is a sectional view of a conductive circuit pattern utilized in the embodiment of FIGS. 4 and 5.

A second exemplary embodiment of the frequency multiplier of the present invention is shown in FIGS. 4, 5 and 6. Referring now to FIG. 4, this embodiment utilizes strip transmission line techniques wherein a conductive circuit 60 is formed on an insulating base 61 in any suitable manner, such as etched circuit or printed circuit techniques. The base 61 is appropriately notched, as at 62 and 63, to accommodate other elements of the circuit.

In FIGS. 5 and 6, the conductive circuit 60 on the insulating base 61 is shown disposed in the conductive enclosure 10. The coupling loop is indicated at 64, connected between the input connector 12 and the elongated conductive member 65 forming the low impedance input transmission line. The elongated conductive member 65 has bifurcated end portions 66 and 67 connected to the appropriate tuning capacitors 23, 33 and 34. The voltage-variable capacitors 26 and 27 are disposed in appropriate openings 68 and 70 in the insulating base 61, and couple the bifurcated end portions 66 and 67 to the output high impedance balanced transmission line members 71 and 72. These output members 71 and 72 are insulated from the enclosure 10 but are capacitively coupled thereto for radio frequency energy by means of tab portions 73 and 74 disposed in close proximity to conductive members 75 and 76 (best seen in FIG. 6). The bias potential +E and −E for the voltage-variable capacitors 26 and 27 are connected to the tab portions 73 and 74 of the output members 71 and 72. The output coupling loop is indicated at 77, and is connected to the output connector 38.

Thus, there has been described a frequency multiplier employing resonant lines and electrically variable unilaterally conductive impedance elements having high efficiency due to isolation of the output energy from the input circuit. When operated as a frequency tripler from 250 to 750 megacycles per second, a conversion loss on the order of 2 decibels has has been attained and an output power in excess of 1 watt. The frequency multiplier of the present invention has also been operated as a doubler from 250 to 500 megacycles per second and from 500 to 1000 megacycles per second, with high efficiency and high power output.

While only two embodiments of the invention have been shown and described, other variations may be made, and it is intended that the foregoing disclosure shall be considered only as illustrative of the principles of the invention and not construed in a limiting sense.

What is claimed is:

1. A frequency multiplier for providing an output signal at a harmonic frequency of an applied input signal having a fundamental frequency comprising:
(a) a conductive case;
(b) a conductive circuit disposed within said case and insulated therefrom, said conductive circuit defining an elongated conductive member, said member having both ends short-circuited to said case at radio frequencies, said member having an elongated bifurcated output section extending from one end thereof being longitudinally divided into first and second portions, said first and second portions being transversely interrupted by respective first and second gaps to form two pairs of elongated spaced-apart structures, the first portion between the first gap and unbifurcated end being resonant at the fundamental frequency, each of said pairs of elongated spaced-apart structures being resonant at the harmonic frequency;
(c) means for coupling an input signal into the unbifurcated portion of said member;
(d) means for coupling an output signal out of said second portion;
(e) a pair of electrically variable nonlinear impedance elements coupled between corresponding ones of said spaced-apart structures and being poled oppositely;
(f) and means for biasing said elements to a predetermined operating point.

2. A frequency multiplier for providing an output signal at a harmonic frequency of an applied input signal having a fundamental frequency comprising:
(a) a conductive case;
(b) a printed circuit board disposed within said case and having a conductive pattern thereon defining an elongated conductive member, said member having both ends short-circuited to said case at radio frequencies, said member having an elongated bifurcated output section extending from one end thereof and being longitudinally divided into first and second portions, said first and second portions being transversely interrupted by gaps to form two pairs of elongated spaced-apart structures, the portion of the member between the gaps and the unbifurcated end being resonant at the fundamental frequency, each of said pairs being resonant at the harmonic frequency;
(c) means for coupling an input signal into the unbifurcated portion of said member;
(d) means for coupling an output signal out of said second portion;
(e) a pair of unilaterally conductive capacitance elements coupled between said spaced-apart structures and being poled oppositely;
(f) and means for biasing said elements in a nonconducting direction.

3. A frequency multiplier for providing an output signal at a harmonic frequency of an applied input signal having a fundamental frequency comprising:
(a) a conducitve case;

(b) an elongated conductive member disposed within said case and having both ends short-circuited thereto at radio frequencies, said member having an elongated bifurcated output section extending from one end thereof, and being longitudinally divided into first and second portions, said first and second portions being transversely interrupted by gaps to form two pairs of elongated spaced-apart structures, the portion of the member between the gaps and the unbifurcated end being resonant at the fundamental frequency, each of said pairs being resonant at the harmonic frequency;
(c) means for coupling an input signal into the unbifurcated portion of said member;
(d) means for coupling an output signal out of said second portion.
(e) a pair of unilaterally conductive capacitance elements coupled between said spaced-apart structures and being poled oppositely;
(f) and means for biasing said elements in a nonconducting direction.

4. A frequency multiplier for providing an output signal at a harmonic frequency of an applied input signal having a fundamental frequency comprising:
(a) a conductive case;
(b) a first elongated conductive member disposed within said case, one end of said first member being short-circuited at radio frequencies to said case and the other end being bifurcated to form elongated spaced-apart portions, said first member in its entirety being resonant at the fundamental frequency, said spaced-apart portions being resonant at the harmonic frequency;
(c) means for coupling an input signal into said first member;
(d) second and third elongated spaced-apart conductive members disposed within said case, said second and third members being resonant at the harmonic frequency, one end of said second and third members being short-circuited at radio frequencies to said case and the other ends of said second and third members being adjacent the ends of the spaced-apart portions of said first member;
(e) means for coupling an output signal out of said second and third members;
(f) a pair of unilaterally conductive capacitance elements, one of said elements being coupled from one of said spaced-apart portions of said first member to said second member, the other of said elements being coupled from the other of said spaced-apart portions of said first member to said third member, said elements being poled oppositely;
(g) and means for biasing said elements in a nonconducting direction.

5. A frequency multiplier for providing an output signal at a harmonic frequency of an applied input signal having a fundamental frequency comprising:
(a) a conductive case;
(b) a first elongated conductive member disposed within said case, one end of said first member being short-circuited at radio frequencies to said case and the other end being bifurcated to form elongated substantially coextensive parallel spaced-apart portions, said first member in its entirety being resonant at the fundamental frequency, said parallel spaced-apart portions being resonant at the harmonic frequency;
(c) means for coupling an input signal into said first member;
(d) second and third elongated substantially coextensive parallel and spaced-apart conductive members disposed within said case, said second and third members being resonant at the harmonic frequency, one end of said second and third members being short-circuited at radio frequencies to said case and the other ends of said second and third members being adjacent the ends of the parallel spaced-apart portions of said first member;

(e) means for coupling an output signal out of said second and third members;

(f) a pair of electrically variable diode capacitors, one of said diode capacitors being coupled from one of said parallel spaced-apart portions of said first member to said second member, the other of said diode capacitors being coupled from the other of said parallel spaced-apart portions of said first member to said third member, said diode capacitors being poled oppositely;

(g) and means coupled to said diode capacitors for biasing said diode capacitors in a nonconducting direction.

6. A frequency multiplier for providing an output signal at a harmonic frequency of an applied input signal having a fundamental frequency comprising:

(a) a conductive case;

(b) a first elongated conductive member disposed within said case, one end of said first member being short-circuited at radio frequencies to said case and the other end being bifurcated to form elongated substantially coextensive parallel spaced-apart portions, said first member in its entirety being resonant at the fundamental frequency, said parallel spaced-apart portions being resonant at the harmonic frequency;

(c) second and third elongated substantially coextensive parallel and spaced-apart conductive members disposed within said case, said second and third members being resonant at the harmonic frequency, one end of said second and third members being short-circuited at radio frequencies to said case and the other end of said second and third members being adjacent an end of the parallel spaced-apart portions of said first member;

(d) a pair of electrically variable diode capacitors, one of said diode capacitors being connected from one of said parallel spaced-apart portions of said first member to said second member, the other of said diode capacitors being connected from the other of said parallel spaced-apart portions of said first member to said third member, said diode capacitors being poled oppositely;

(e) means coupled to said diode capacitors for biasing said diode capacitors in a nonconducting direction;

(f) means for coupling an input signal into said first member;

(g) and means for coupling an output signal out of said second and third members.

7. A frequency multiplier for providing an output signal at a harmonic frequency of an applied input signal having a fundamental frequency comprising:

(a) a transmission line outer conductor;

(b) a first elongated conductive member disposed within said outer conductor, one end of said first member being coupled to said outer conductor and the other end being bifurcated to form elongated substantially coextensive parallel spaced-apart portions, said first member in its entirety forming an input transmission line center conductor resonant in quarter-wave mode at the fundamental frequency, said parallel spaced-apart portions forming a first pair of balanced transmission line center conductors resonant in quarter-wave mode at the harmonic frequency;

(c) second and third elongated conductive members disposed within said outer conductor, said second and third members being substantially coextensive parallel and spaced-apart to form a second pair of balanced transmission line center conductors resonant in quarter-wave mode at the harmonic frequency, said second and third members extending substantially collinearly with the parallel spaced-apart portions of said first member, one end of said second and third members being coupled to said outer conductor and the other end of said second and third members being adjacent an end of the parallel spaced-apart portions of said first member;

(d) a pair of electrically variable diode capacitors, one of said diode capacitors being connected from one of said parallel spaced-apart portions of said first member to said second member, the other of said diode capacitors being connected from the other of said parallel spaced-apart portions of said first member to said third member, said diode capacitors being poled oppositely;

(e) means coupled to said diode capacitors for biasing said diode capacitors in a nonconducting direction;

(f) an input loop coupled to said first member for coupling an input signal into said first member;

(g) and an output loop coupled to said second and third members and located symmetrically therebetween for coupling an output signal out of said second and third members.

8. A frequency multiplier for providing an output signal at a harmonic frequency of an applied input signal having a fundamental frequency comprising:

(a) an elongated conductive enclosure forming a transmission line outer conductor;

(b) a first elongated conductive member disposed within said conductive enclosure, one end of said first member being conductively connected to said enclosure and the other end being bifurcated to form elongated substantially coextensive parallel spaced-apart portions, said first member in its entirety forming an input transmission line center conductor resonant in quarter-wave mode at the fundamental frequency, said parallel spaced-apart portions forming a first pair of balanced transmission line center conductors resonant in quarter-wave mode at the harmonic frequency;

(c) second and third elongated conductive members disposed within said conductive enclosure, said second and third members being substantially coextensive parallel and spaced-apart to form a second pair of balanced transmission line center conductors resonant in quarter-wave mode at the harmonic frequency, said second and third members extending substantially collinearly with the parallel spaced-apart portions of said first member, one end of said second and third members being conductively connected to said enclosure and the other end of said second and third members being adjacent an end of the parallel spaced-apart portions of said first member;

(d) a pair of electrically variable capacitance diodes, one of said capacitance diodes being connected from one of said parallel spaced-apart portions of said first member to said second member, the other of said capacitance diodes being connected from the other of said parallel spaced-apart portions of said first member to said third member, said capacitance diodes being poled oppositely;

(e) a source of potential coupled to said capacitance diodes and poled to bias said capacitance diodes in a nonconducting direction;

(f) an input loop coupled to said first member intermediate the connection of said first member to said enclosure and said parallel spaced-apart portions for coupling an input signal into said enclosure and into said first member;

(g) and an output loop coupled to said second and third members and located symmetrically therebetween for coupling an output signal out of said second and third members and out of said enclosure.

9. A frequency multiplier for providing an output signal at a harmonic frequency of an applied input signal having a fundamental frequency comprising:

(a) an elongated conductive enclosure forming a transmission line outer conductor;

(b) a first elongated conductive member disposed within said conductive enclosure, one end of said first member being conductively connected to said enclosure and the other end being bifurcated to form elongated substantially coextensive parallel spaced-apart portions, said first member in its entirety forming an input transmission line center conductor, said parallel spaced-apart portions forming a first pair of balanced transmission line center conductors;

(c) second and third elongated conductive members disposed within said conductive enclosure, said second and third members being substantially coextensive parallel and spaced-apart to form a second pair of balanced transmission line center conductors, said second and third members extending substantially collinearly with the parallel spaced-apart portions of said first member, one end of said second and third members being conductively connected to said enclosure and the other end of said second and third members being adjacent an end of the parallel spaced apart portions of said first member;

(d) five capacitors having one terminal connected to said enclosure, the remaining terminal of one of said capacitors being connected to said first member intermediate the connection of said first member to said enclosure and said parallel spaced-apart portions for tuning said first member to be resonant in quarter-wave mode at the fundamental frequency, two different ones of said capacitors having their remaining terminals connected to said parallel spaced-apart portions for tuning said first pair of balanced transmission line center conductors to be resonant in quarter-wave mode at the harmonic frequency, the remaining two of said capacitors having their remaining terminals connected to said second and third members, respectively, for tuning said second pair of transmission line center conductors to be resonant in quarter-wave mode at the harmonic frequency;

(e) a pair of electrically variable capacitance diodes, one of said capacitance diodes being connected from one of said parallel spaced-apart portions of said first member to said second member, the other of said capacitance diodes being connected from the other of said parallel spaced-apart portions of said first member to said third member, said capacitance diodes being poled oppositely;

(f) a source of potential coupled to said capacitance diodes and poled to bias said capacitance diodes in a nonconducting direction;

(g) an input loop coupled to said first member intermediate the connection of said first member to said enclosure and said parallel spaced-apart portions for coupling an input signal into said enclosure and into said first member;

(h) and an output loop coupled to said second and third members and located symmetrically therebetween for coupling an output signal out of said second and third members and out of said enclosure.

References Cited

UNITED STATES PATENTS 3,267,352 8/1966 Blight -------------- 321—69

JOHN F. COUCH, *Primary Examiner.*

G. GOLDBERG, *Assistant Examiner.*